June 4, 1968 G. D. GRIFFIN 3,386,705
COMPOSTING MACHINE
Filed Dec. 8, 1966 3 Sheets-Sheet 1
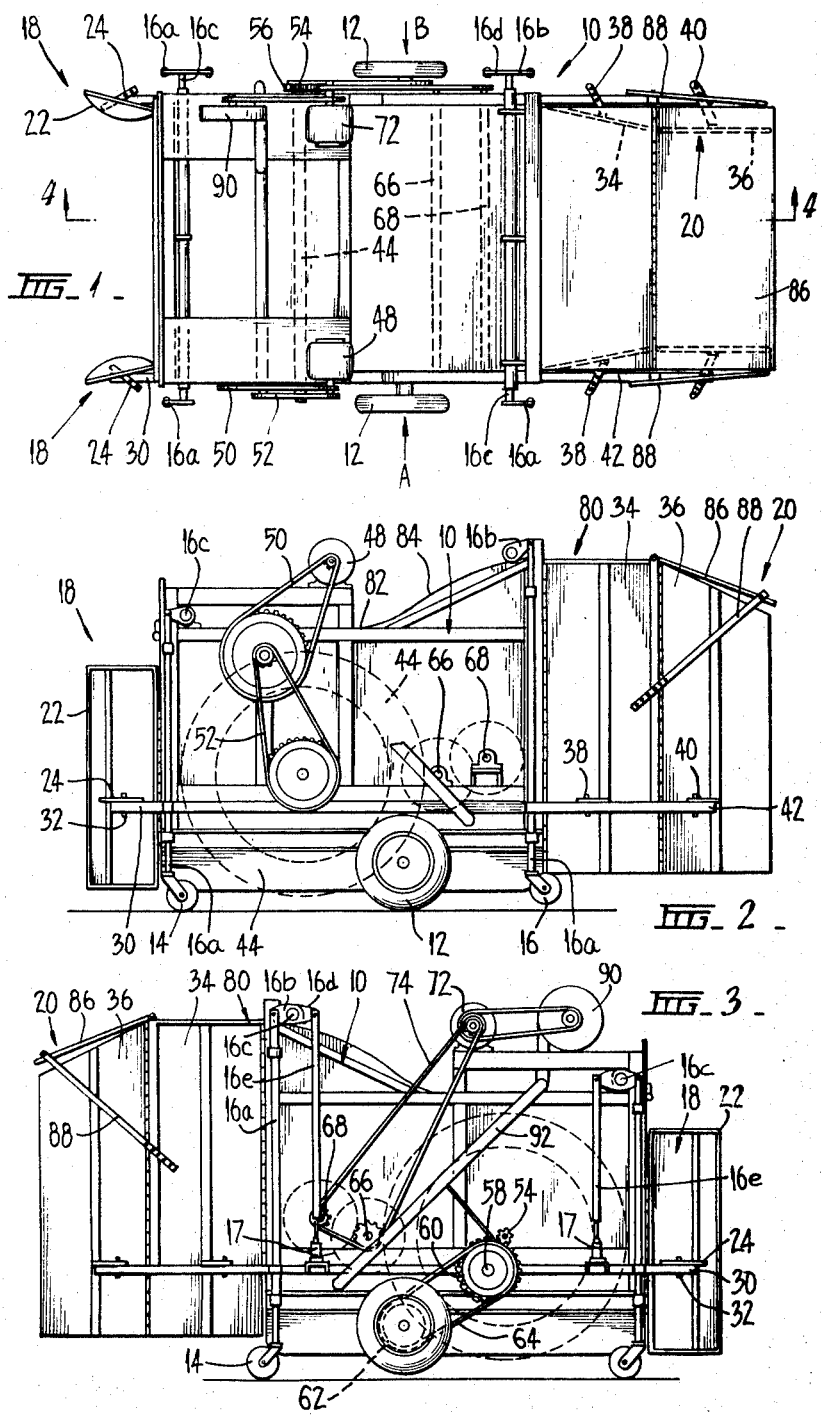

June 4, 1968 G. D. GRIFFIN 3,386,705
COMPOSTING MACHINE
Filed Dec. 8, 1966 3 Sheets-Sheet 2
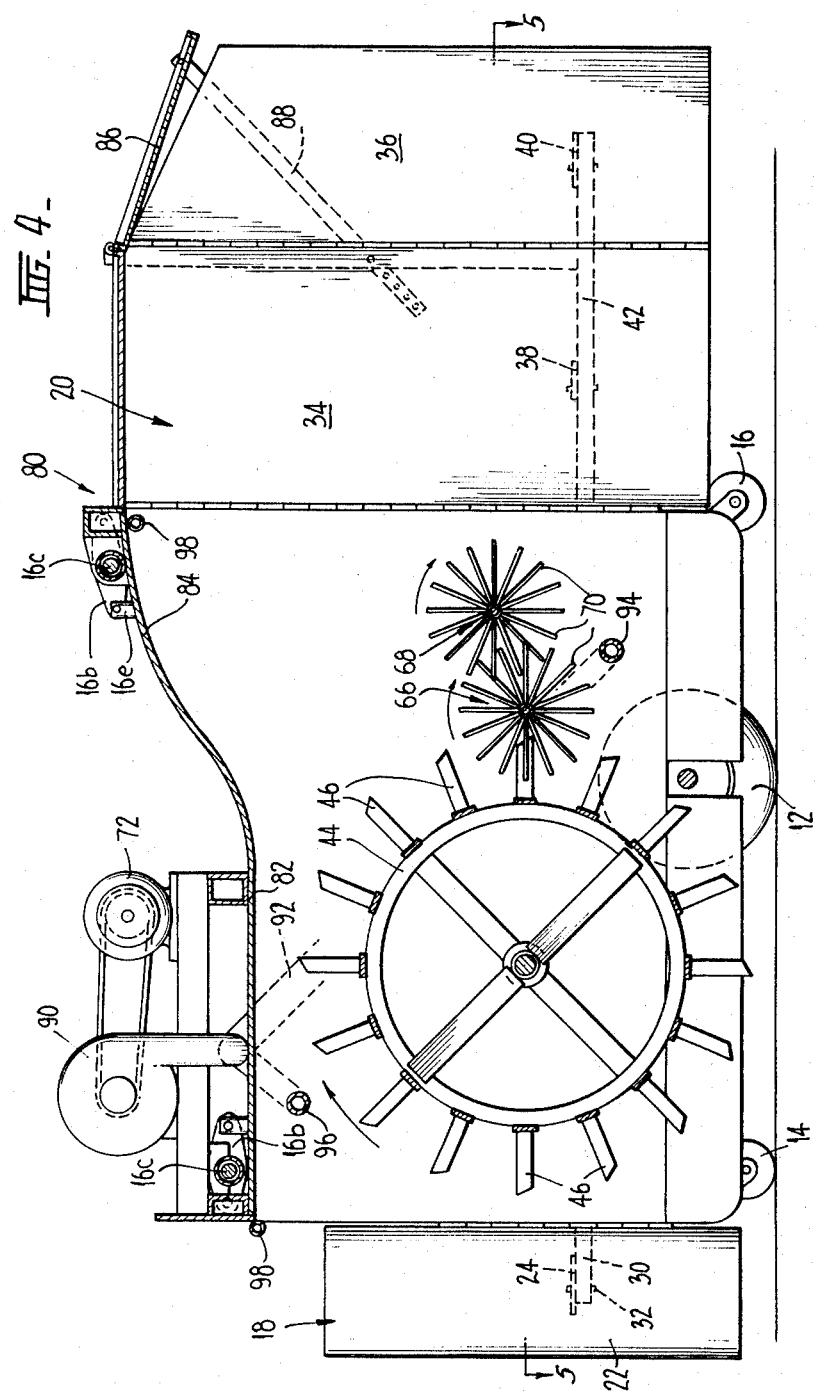

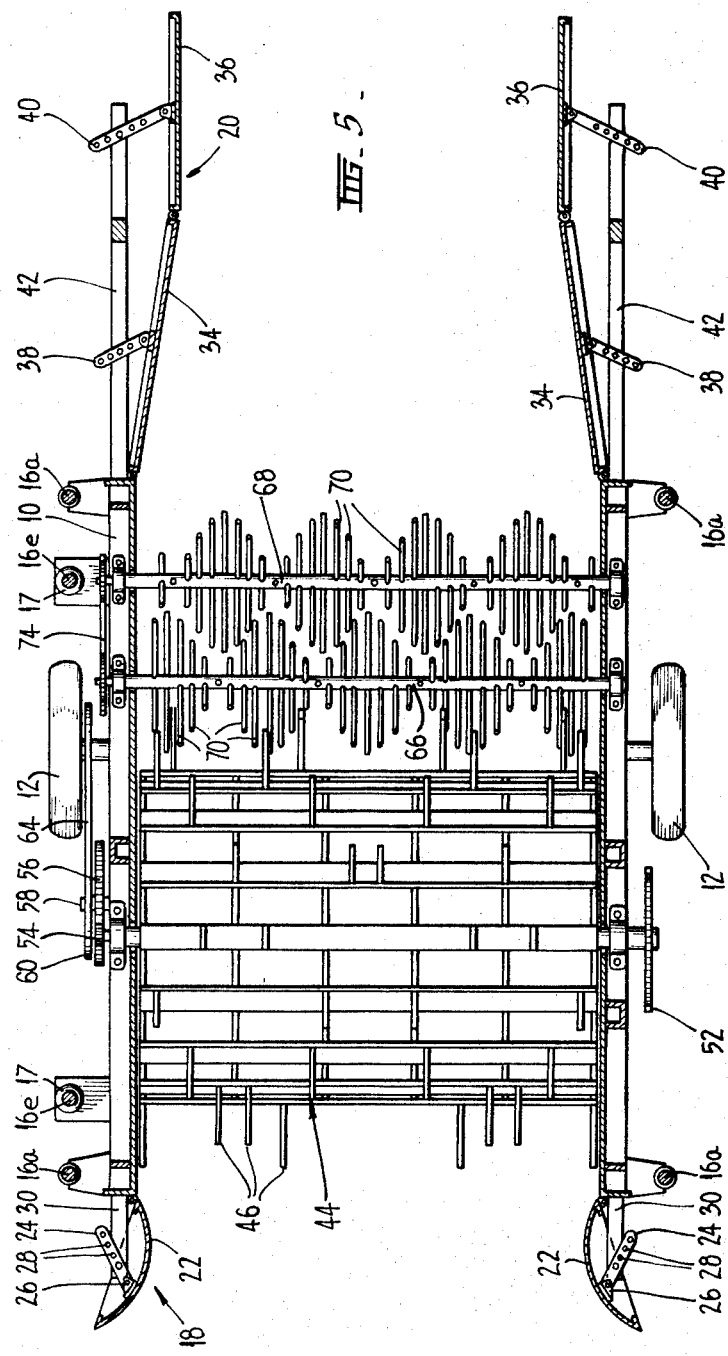

United States Patent Office 3,386,705
Patented June 4, 1968

3,386,705
COMPOSTING MACHINE
Gordon D. Griffin, Roland Highway,
Spreyton, Tasmania, Australia
Filed Dec. 8, 1966, Ser. No. 600,250
Claims priority, application Australia, Dec. 13, 1965,
67,793/65
17 Claims. (Cl. 259—6)

ABSTRACT OF THE DISCLOSURE

A composting machine having guide walls mounted at the forward end of a wheeled frame for contacting the sides of a stack of compost for guiding the machine during operation, a slowly rotatable tined roller being mounted between the guide walls to feed the compost rearwardly to at least one set of rapidly rotatable tines which throw the compost upwardly and rearwardly at high velocity.

---

This invention relates to an improved composting machine and more particularly to an improved machine for turning and aerating the manure and other ingredients used in the preparation of the compost required by mushroom growers for the beds in which they grow their product.

As a result of a considerable amount of experimental work, mushroom growing has now reached the stage of an exact science. In every mushroom house elaborate precautions are taken to ensure that the crop will grow free from disease, at an ideal temperature, and with an ideal moisture content in the bed.

Fundamental to the whole process, however, is the provision of a suitable compost. The basis of this is usually horse manure obtained from racing stables and army and police stables. To this are added such ingredients as maltings, gypsum, urea, calcium carbonate and superphosphate in predetermined proportions.

Upon arrival at the mushroom farm or commercial composting plant, the manure is stacked in long heaps, approximately six feet wide and six feet high, for a period of five to seven days for preliminary fermentation. In some instances certain of the ingredients are added to it at this stage. At the end of the preliminary fermentation period, the stack is turned over and at the same time water and additional ingredients are added to it. At the end of a further three or four days the heap is again turned over.

In all the heap is usually turned four times at approximately three to four day intervals during fermentation, the later turnings being merely for the purpose of aeration to permit fermentation to continue.

When the compost has reached a predetermined state it is either loaded into trays in the mushroom house if prepared on a mushroom farm, or is boxed for shipment to mushroom growers if prepared in a commercial composting establishment.

The turnover of the compost heaps is usually accomplished with the aid of a machine, known as a composting machine, consisting of a frame having a pair of driving wheels at its forward end and a pair of caster type wheels at its rear end for maneuverability.

The width of the machine between the wheels is somewhat greater than the width of the compost heap and a pair of guide flaps extend forwardly from the frame one on each side of the heap. On the frame itself there is mounted some form of means for elevating the manure and means for adding water and fertilizers to it. The frame carries one or more electric motors for driving the elevating means and the driving wheels, electric motors being preferred to diesel or gasoline engines because of possible interference with the fermentation of the compost by the diesel or gasoline fumes unless suitable precautions are taken.

The elevating means usually consists of a rearwardly and upwardly inclined endless conveyor provided at intervals with transverse rows of tines projecting at right angles to its surface. In certain machines this conveyor engages the compost heap directly, tearing the manure away from the heap and elevating it for treatment and aeration.

In other forms of machine there is provided a tined roller which engages the heap ahead of the conveyor and which is of such diameter and is so located that it removes the upper portion of the heap and passes it to the conveyor while the lower portion of the heap is directly engaged by the conveyor and fed upwardly.

In a still further form of machine a large tined roller ahead of the conveyor engages the full cross-section of the heap, its tines tearing away the manure and passing it over the top of the roller to drop onto the conveyor.

Adjacent the top of the conveyor in each of these known automatic composting machines there is mounted a rapidly rotating tined roller which rotates in a clockwise direction as viewed from the right hand side of the machine. The compost drops from the conveyor into this roller, the tines serving to break up any lumps in the compost and shoot it rearwardly and downwardly. A guide plate is usually located around part of the periphery of the tined roller to assist in directing the compost.

A pair of stacking walls extend rearwardly from the frame of the machine to guide the compost discharged from the tined roller and build it into a neat heap behind the machine as it progresses through the stack.

The machines described are heavy and cumbersome and are expensive in both initial cost and operating cost. They do not aerate the manure to the full extent which could be desired and due to the fact that they are arranged to raise the manure to a height which will permit it to drop on to the newly formed stack after passing through the tined roller, it is not unusual for their overall height to be as much as twelve feet.

Accordingly it is an object of this invention to provide a composting machine of simpler construction than those hitherto available and hence lighter in weight and lower in overall height.

It is a further object of the invention to provide a composting machine which will achieve substantially complete aeration and which will be low in first cost and at the same time sturdy in construction so that it will require very little maintenance.

With a view to achieving these objects the invention provides a composting machine comprising a wheeled frame having means adapted to contact compost stacked in a heap and feed it rearwardly, and one or more sets of rapidly rotatable tines adapted to receive the compost fed by said means and throw it upwardly and rearwardly at a relatively high velocity.

The means for feeding the compost rearwardly preferably comprises a tined roller adapted to be rotated in a counter-clockwise direction as viewed from the left hand side of the machine, but may alternatively comprise a short endless conveyor which is inclined upwardly and rearwardly and which is provided at spaced intervals throughout its length with transverse sets of tines.

The overall height of the tined roller (or of the inclined conveyor where such is used) need not be greater than, and can even be slightly less than, the overall height of the heap of compost to be treated. As indicated above when the heap is first formed its height is approximately six feet but this normally sinks to approximately four feet by the time it is ready for turning. After teasing and aeration in the composting machine the manure regains most of its bulk and the heap left behind the machine is again approximately six feet high.

With the machines at present in use it is therefore necessary to lift the compost to a height considerably above six feet so that it may fall into the tined roller at the head of the conveyor and then fall into the new heap which is being formed. A relatively long conveyor is therefore required, thus adding considerably to both the height and the length of the machine. Where a pick-up roller is used in addition to the conveyor the length of the machine is further increased. With the machine of the present invention the height of the means for feeding the compost rearwardly need only be sufficient to enable it to handle the compost at the speed at which the machine is driven through the heap, the raising of the compost to the height required for forming the new heap being effected by the rapidly rotating set or sets of tines.

Preferably the machine is provided with two sets of such tines, and the tines may be mounted in such manner that their position is adjustable to suit the density of the compost being treated.

In order that the invention may be more readily understood it will now be described by way of example with reference to a particular embodiment illustrated in the accompanying drawings wherein:

FIGURE 1 is a plan view of a composting machine according to the invention,

FIGURE 2 is a side elevational view of the composting machine in the direction of arrow A in FIGURE 1, FIGURE 3 is a side elevational view of the composting machine in the direction of arrow B in FIGURE 1, FIGURE 4 is a sectional elevational view taken on line 4—4 of FIGURE 1, and FIGURE 5 is a sectional plan view taken on line 5—5 of FIGURE 4.

The embodiment of the composting machine of this invention comprises a rigid frame 10 having a pair of driving wheels 12 mounted slightly to the rear of its centre of gravity and a pair of adjustably mounted caster wheels 14 one on each side towards its forward end. To the rear of the driving wheels there is provided a further pair of caster wheels 16 adjustably mounted to permit them to be moved downwardly to raise the driving wheels clear of the ground. The purpose of the additional caster wheels 16 is to give the machine a high degree of maneuverability in confined spaces.

The mounting of the caster wheels is best seen in FIGURES 1 to 3, where each is illustrated as connected to the lower end of a vertically slidable pipe 16a pivotally connected at its upper end to a lever 16b which is welded to project radially from the surface of a shaft 16c pivotally mounted and extending transversely of the machine to connect a pair of said levers 16b. On the right hand side of the machine each lever 16b is extended as indicated at 16d and pivotally connected to a short generally vertical length of pipe 16e, the lower end of which is acted upon by a hydraulic jack 17 mounted on the frame 10. It will be clear that operation of the hydraulic jacks to raise members 16e will cause members 16a and casters 16 to move downwardly relative to the frame 10. This action can be used to trim the machine to give it a horizontal position as illustrated in FIGURE 2 and can be used to raise the driving wheels clear of the ground as illustrated in FIGURE 3 for the purpose of maneuvering in confined spaces.

The usual guide walls 18 and stacking walls 20 are provided at the forward and rearward ends of the frame 10 respectively, the guide walls 18 having pivoted flaps 22 at their forward ends which can be moved towards or away from each other to suit the width of the heap being treated. Each pivoted flap 22 is of arcuate shaped in plan view (see FIGURES 1 and 5) for tangential contact with the sides of the heap. A stay bar 24 is pivotally connected to a bracket 26 on the back of each flap 22, each bar 24 being formed with a plurality of drilled holes 28 to enable the flap to be held in a position of adjustment by alignment of the appropriate hole 28 with a similar hole in side member 30 of the frame 10, and placing a pin 32 in the aligned holes.

The stacking walls 20 are formed in two parts 34, 36, the forward part 34 being pivoted to the frame 10 and also to the rearward part 36. With this arrangement the rearward parts 36 can be moved towards or away from each other while maintaining a parallel relationship between them. The width of the newly formed stack can thus be controlled.

The forward part 34 of each stacking wall 20 is provided with a pivoted stay bar 38 similar to bar 26, and each rear part of each stacking wall is provided with a pivoted stay bar 40. The stay bars 38, 40 have drilled holes for co-operation with drilled holes in longitudinal members 42 telescopically mounted in frame 10 for a purpose which will hereinafter appear. The distance between the stacking walls, and therefore the width of the stack to be formed, is adjusted by first positioning the forward parts 34 so that their rearward ends are the appropriate distance apart and then adjusting the rearward parts 36 so that they are parallel.

The frame 10 of the machine is constructed generally in the shape of an inverted U as seen from the forward or rearward end, and at its forward end between the arms of the U there is mounted a rotatable roller 44 having tines 46 projecting from its surface to contact the manure in the heap as the machine is fed through it.

The roller 44 is of a size to permit it to feed the whole of the heap. For this purpose it may be approximately six feet in length and four feet in diameter, with tines 46 extending nine inches from its surface. The overall diameter of roller and its tines is thus five feet and six inches.

An electric motor 48 is provided on top of the frame 10 for driving, by means of a double reduction chain drive 50, 52, the pick-up roller 44. The chain drives 50, 52 can be seen in FIGURE 2. On the end of the shaft of pick-up roller 44 opposite the chain drive 50, 52 there is mounted a pinion 54. Pinion 54 is arranged to drive a gear 56 on a countershaft 58 which also carries a sprocket 60 which drives a sprocket 62, mounted on one of the drive wheels 12, by means of a chain 64. The speed of rotation of the roller is relatively slow and is so related to the speed of the driving wheels that excessive force is not required to cause the tines to penetrate the heap. A suitable speed for the roller has been found to be approximately 30 r.p.m. Although the drive wheels are here described and illustrated as driven from the motor which drives the pick-up roller, it will be obvious that a separate motor may be provided for the drive wheels.

Mounted behind the roller are two spaced tined shafts 66, 68 each of which has a plurality of tines 70 extending from its surface. Conveniently, each shaft may be made from a length of four inch pipe and the tines 70 may consist of bars approximately twenty inches long passing through diametrically opposite drilled holes in the pipe and extending approximately eight inches on each side of the pipe. The tines may be welded in position.

As can be seen in FIGURE 5, the tines are arranged in a helical pattern, the angle of the helix being approximately 45°. The helix is of right-hand configuration for one half of the circumference of the shaft at the left side of the machine, then changes to left-hand configuration for one and a half circumferences of the shaft, the end of the left-hand section being approximately at the center of the machine. The tines to the right of the center of the machine are arranged as a mirror image of those to the left of the center. It is found in practice that this arrangement of the tines superimposes on the turnover mixing action, a cross-mixing action which results in very thorough and uniform intermingling of the various ingredients.

The spacing between the axis of the roller 44 and the axis of the first tined shaft 66 is such that the respective tines overlap, with the tines of the tined shaft just clearing the surface of the roller and the tines of the roller just clearing the surface of the shaft. The axes of the two tined shafts 66, 68 are similarly spaced. As viewed from the right hand side of the machine the roller 44 and the two tined shafts are all rotated in a clockwise direction, the tined shafts being driven by an electric motor 72 and a chain drive 74. It has been found that a suitable speed for the first tined shaft 66 is approximately 400 r.p.m., and for the second tined shaft 68, approximately 800 r.p.m.

Also mounted on the frame is a guide hood 80 for the compost having a section 82 which extends horizontally above the pick-up roller 44, a section 84 which extends upwardly and rearwardly above the tined shafts 66, 68, and a pivoted flap 86 connected to the rear edge of section 86 to extend downwardly and rearwardly to guide the compost between the stacking walls. Adjustable stays 88 at each side of the machine support flap 86 in its selected position.

The compost usually comprises a proportion of fines, and the heap being treated may have a relatively thick layer of gypsum powder spread on top of it for mixing into the compost during aeration. In some circumstances, unless preventive measures are taken, the gypsum and fines will drop through the tined shafts and form the lower layer of the new heap rather than be intimately mixed with it. For this reason a centrifugal blower 90 driven by electric motor 70 is mounted, in the exemplary embodiment, on top of the frame 10 and is connected by conduit 92 to a header 94 mounted beneath the tined shafts and provided with upwardly directed jets. The velocity and pattern of air flow from the jets is such as to prevent the fines falling through the tined shafts. There could also be some tendency for the air flow from the jets to cause the fines to be blown out through the forward end of the hood 80. For this reason a further header 96 is provided connected to the blower and mounted above the tined roller with jets projecting rearwardly. However, for composts treated to date with the apparatus of the invention, air jets have not been found necessary, and consequently the apparatus has been operated with the drive to the blower disconnected.

Moistening sprays and fertilizer adding means are provided within the hood as in the case of previous composting machines. A spray header is shown at 98, but the fertilizer adding means are not illustrated since they are of known type.

Towards the rear of the machine, at a suitable height above ground level, there may be provided a conveyor (not shown) adapted to collected treated compost and feed it out through an aperture in the side of the machine to a suitable form of boxing arrangement. The conveyor may be either permanently attached to the machine or may be arranged to be connected to the machine when required and readily disconnected therefrom when not required.

For storage purposes, the dimensions of the machine can be readily reduced by releasing the stay bars 38 and 40 to enable the stacking walls 20 to be folded against the rear of the frame 10. Side members 42 are then telescoped into the frame 10 and pivoted flap 86 of the guide hood 80 is folded down over the stacking walls.

The operation of the apparatus is as follows: The machine is first aligned with a heap of compost to be treated and the flaps of the guide walls 18 are set to the width of the heap while the rear stacking walls 20 are set to the width of the new heap to be formed. The motors 48, 72 driving the pick-up roller, the wheels and the tined shafts, are started and the machine is driven into the heap. The compost is picked up by the tines of roller 44 and carried over the top of the roller to the tined shafts 66, 68. To some extent the compost is thrown from the roller onto the tined shafts and to some extent it is removed from the tines of the roller by the intermeshing of the tines of the roller and the first shaft 66.

As a result of its contact with the tined shafts the compost is thrown upwardly and rearwardly into the hood, a large proportion being thrown to a height greater than that of the required new heap. In the hood or at the forward end of the machine moisture and fertilizers are added to the compost which, after being thrown upwardly and rearwardly by the tined shafts, falls down and is moulded into a new heap by means of the pivoted flap 86 and the stacking walls 20.

Where the heap of compost being treated has been fermented to the desired extent it is picked up in the manner above indicated but instead of being guided to form a new stack it is guided onto the transverse conveyor and fed out through the side of the machine to be placed in boxes.

The machine which has been described possesses all of the advantages pointed out hereinabove as being desirable and in addition provides better teasing and lump-disintegrating effects than prior art composting machines. This results from the fact that, whereas in the prior art machines the compost drops from the top of the conveyor into a tined roller which continues its motion in the same direction, in the machine of the present invention the compost contacts tined shafts, of which the tines are moving rapidly in a direction opposite to that in which the compost is travelling. In addition, the intermeshing between the tines of the roller and the first shaft and between the tines of the first shaft and second shaft, adds considerably to the teasing and lump-disentegrating action.

Aeration is also substantially more effective with the composting machine of the present invention partly because of the cross-mixing action, partly because of the teasing and lump-disintegrating action, and partly because, instead of being directed in a substantially solid mass onto the new heap, the compost is projected upwardly and rearwardly at high velocity by the tines and allowed to settle onto the new heap, thus permitting it to spend a greater time in the air in a much looser formation.

As modifications within the spirit and scope of the invention may readily be effected by persons skilled in the art, it is to be understood that this application is not limited to the details of the composting machine described by way of example hereinabove, but is limited only by the appended claims.

What is claimed is:

1. A composting machine adapted to travel along an elongated stack of fermenting compost and to turn the compost over, serate it and re-stack it for further fermentation, said machine comprising a wheeled frame having forward and rear ends, a pair of guide walls mounted at the forward end of the frame, said guide walls being adapted to contact the sides of the stack of compost for the purpose of guiding the machine during operation, a rotatable tined roller rotatably mounted at the forward end of the frame between said guide walls, the overall diameter of said tined roller being substantially equal to the height of the stack of compost, means to feed the compost rearwardly as the machine advances through the stack and at least one set of rapidly rotatable tines adapted to receive the compost fed by said means and throw it upwardly and rearwardly at a relatively high velocity.

2. A composting machine as claimed in claim 1, wherein each set of rapidly rotatable tines comprises a rotatable shaft having tines projecting therefrom at diametrically opposite locations.

3. A composting machine as claimed in claim 2, wherein the tines are helically arranged to promote a cross-mixing action in the compost.

4. A composting machine as claimed in claim 2, wherein two sets of said rapidly rotatable tines are provided, the tines of the first set overlapping with the tines of the tined roller and with the second set of the rotatable tines.

5. A composting machine as claimed in claim 1, wherein two sets of said ro rotatable tines are provided.

6. A composting machine as claimed in claim 1, wherein two sets of rapidly rotatable tines are provided, the axis of rotation of the first set of tines being located at approximately the same height as the axis of rotation of the tined roller.

7. A composting machine as claimed in claim 6, wherein the axis of rotation of the second set of rapidly rotatable tines is above the axis of rotation of the first set of rapidly rotatable tines.

8. A composting machine as claimed in claim 1, wherein the wheeled frame is provided with a pair of drive wheels a short distance to the rear of its center of gravity, and a pair of caster wheels in the region of its forward end.

9. A composting machine as claimed in claim 8 including a further pair of caster wheels at the rear end of the frame, said caster wheels being mounted in vertically adjustable manner so that they may be projected downwardly to raise the drive wheels clear of the ground.

10. A composting machine according to claim 8, including means for driving said drive wheels at a relatively slow speed from the shaft of said tined roller.

11. A composting machine as claimed in claim 1 including a pair of adjustable stacking walls mounted at the rear of the frame.

12. A composting machine according to claim 11, wherein each of said stacking walls is constructed in two pivotally connected sections, a forward section and a rear section, the forward section being pivoted about a substantially vertical axis to the frame and the rear section being pivoted about a substantially vertical axis to the forward section, the arrangement being such that the forward sections may be adjusted to set their rear edges at a distance apart corresponding to the required width of a stack of compost to be formed by the machine and the rear sections may then be adjusted to adopt a parallel arrangement.

13. A composting machine according to claim 1, including a hood over the rapidly rotatable tines and an adjustable guiding flap for compost hinged about a substantially horizontal axis to the rear of the hood.

14. A composting machine according to claim 13, including moistening sprays and fertilizer adding means within said hood.

15. A composting machine according to claim 1, wherein said means for rotating the tined roller at a relatively slow speed comprises an electric motor.

16. A composting machine according to claim 1, including an electric motor arranged to drive said rapidly rotatable tines.

17. A composting machine according to claim 1, including a centrifugal blower and a header connected to said blower and positioned to prevent the separation of fines from a compost mix.

References Cited
UNITED STATES PATENTS

| | | | |
|---|---|---|---|
| 587,444 | 8/1897 | Kraft | 259—126 |
| 2,195,221 | 3/1940 | Millikin | 94—39.51 |

ROBERT W. JENKINS, *Primary Examiner.*